United States Patent [19]
Taylor

[11] Patent Number: 6,062,630
[45] Date of Patent: May 16, 2000

[54] MAGNETIC SOFT POCKET WINDOW REPLACEMENT SYSTEM

[76] Inventor: Laron Lee Taylor, 100 Hilltop Dr., #28, Redding, Calif. 96003

[21] Appl. No.: 09/093,994

[22] Filed: Jun. 9, 1998

Related U.S. Application Data

[60] Provisional application No. 60/049,273, Jun. 10, 1997.

[51] Int. Cl.⁷ .................................................. B60J 1/18
[52] U.S. Cl. .................. 296/146.14; 296/145; 296/201; 296/107.07
[58] Field of Search ............................. 296/145, 146.14, 296/201, 107.07; 160/368.1, 354; 49/463, 465; 52/DIG. 4, 208

[56] References Cited

U.S. PATENT DOCUMENTS

| | | | |
|---|---|---|---|
| 1,356,389 | 10/1920 | Morse | 296/145 |
| 2,595,833 | 5/1952 | Flaherty . | |
| 2,638,379 | 5/1953 | Spring | 296/145 |
| 2,717,036 | 9/1955 | Harris | 160/354 |
| 3,016,952 | 1/1962 | Shero . | |
| 3,679,505 | 7/1972 | Hinderaker . | |
| 3,805,872 | 4/1974 | Lorber . | |
| 3,827,019 | 7/1974 | Serbu . | |
| 4,409,758 | 10/1983 | Dickerson . | |
| 4,510,986 | 4/1985 | Schwanke . | |
| 4,802,523 | 2/1989 | Scholten . | |
| 5,040,844 | 8/1991 | Stolz . | |
| 5,090,469 | 2/1992 | Boulanger . | |
| 5,454,615 | 10/1995 | Schnepf . | |

*Primary Examiner*—D. Glenn Dayoan
*Assistant Examiner*—Lori L. Coletta
*Attorney, Agent, or Firm*—Lee W. Tower

[57] ABSTRACT

A window system including a plurality of side assemblies, each side assembly having first and second flexible material frame members that are coupled together along a seam. First and second magnetic material strips are coupled to an interior wall of the first and second flexible material frame members, respectively, so that the first and second magnetic strips attract each other. A plurality of corner closure assemblies are adapted for joining a first adjacent side assembly and a second adjacent side assembly of the plurality of side assemblies and each corner closure assembly has first and second flexible material corner members that are coupled together along a seam. First and second magnetic material pieces are coupled to an interior wall of the first flexible material corner member and to an opposite interior wall of the second flexible material corner member, so that the first and second magnet pieces attract each other. The first flexible material corner member overlaps the first flexible material frame member of the first adjacent side assembly and overlaps the first flexible material frame member of the second adjacent side assembly. A window material is removably clamped between the first and second magnet strips of each side assembly and between the first and second magnet pieces of each corner closure assembly. Each second flexible material corner member of each corner closure assembly is removably coupled to the second flexible material frame members of the first and second adjacent side assemblies.

17 Claims, 15 Drawing Sheets

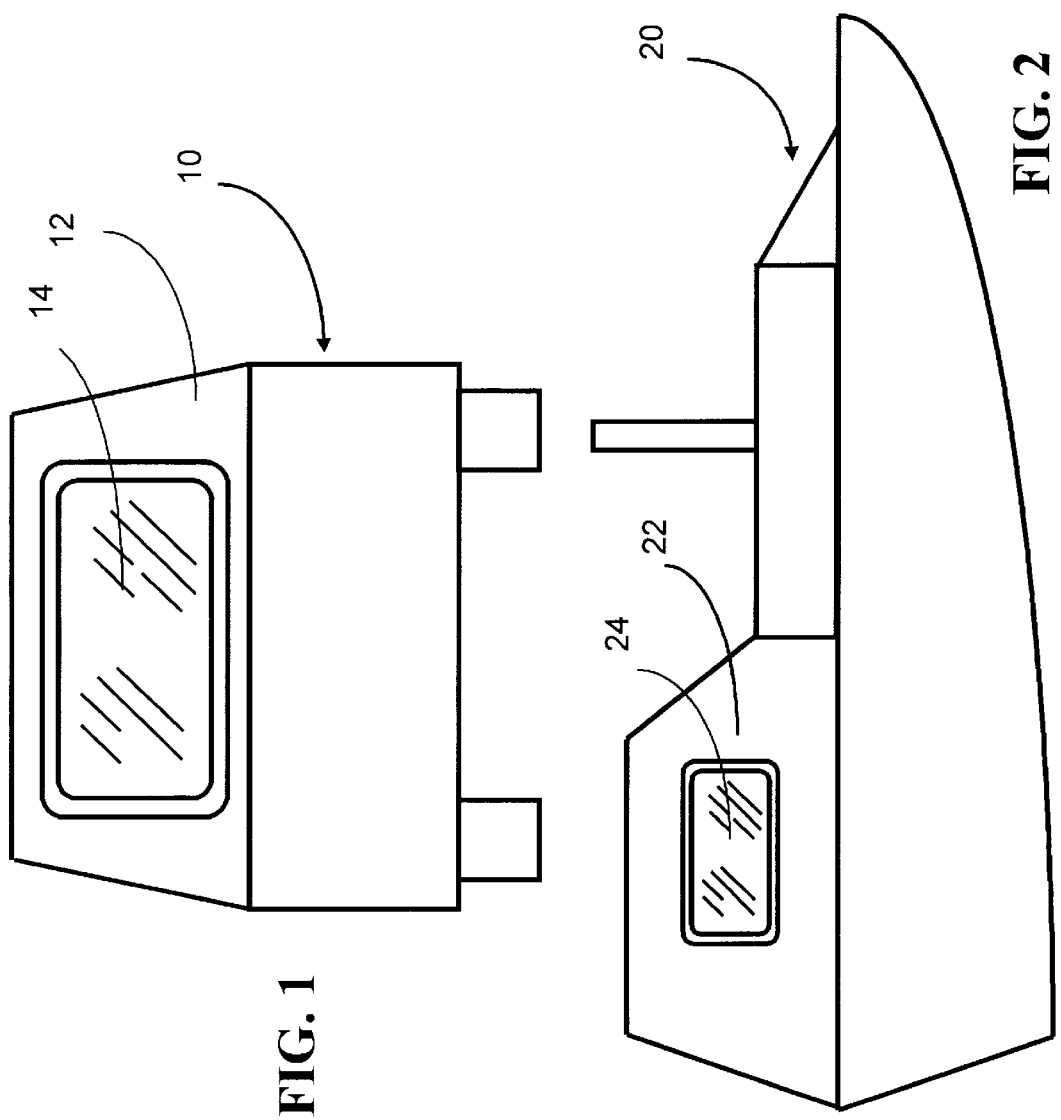

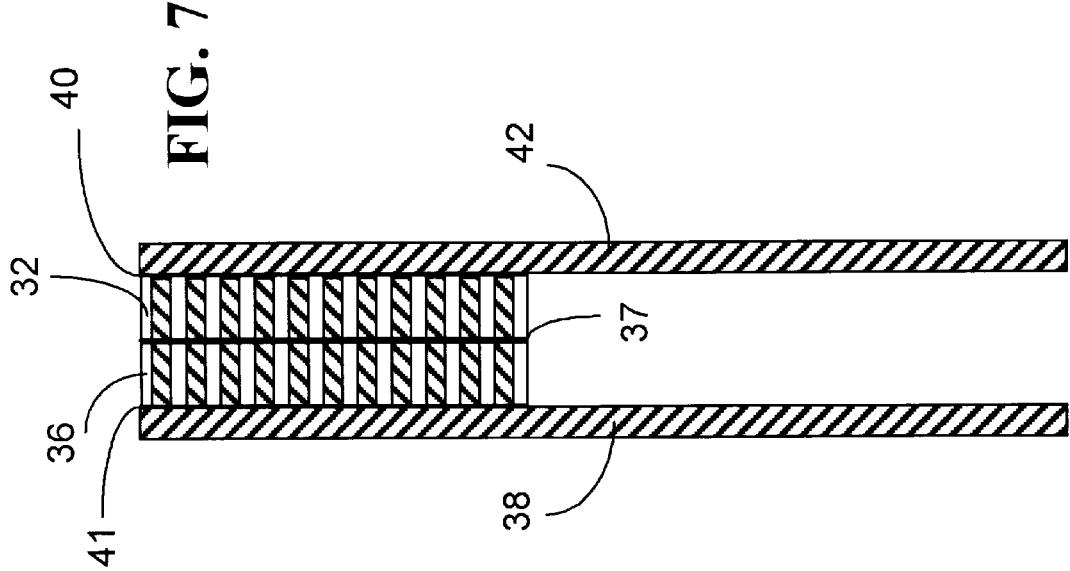
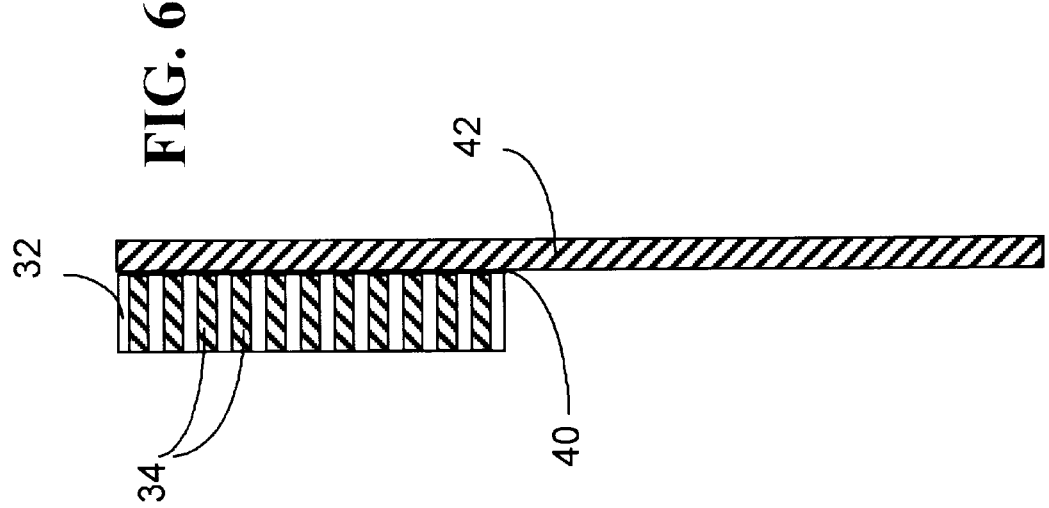

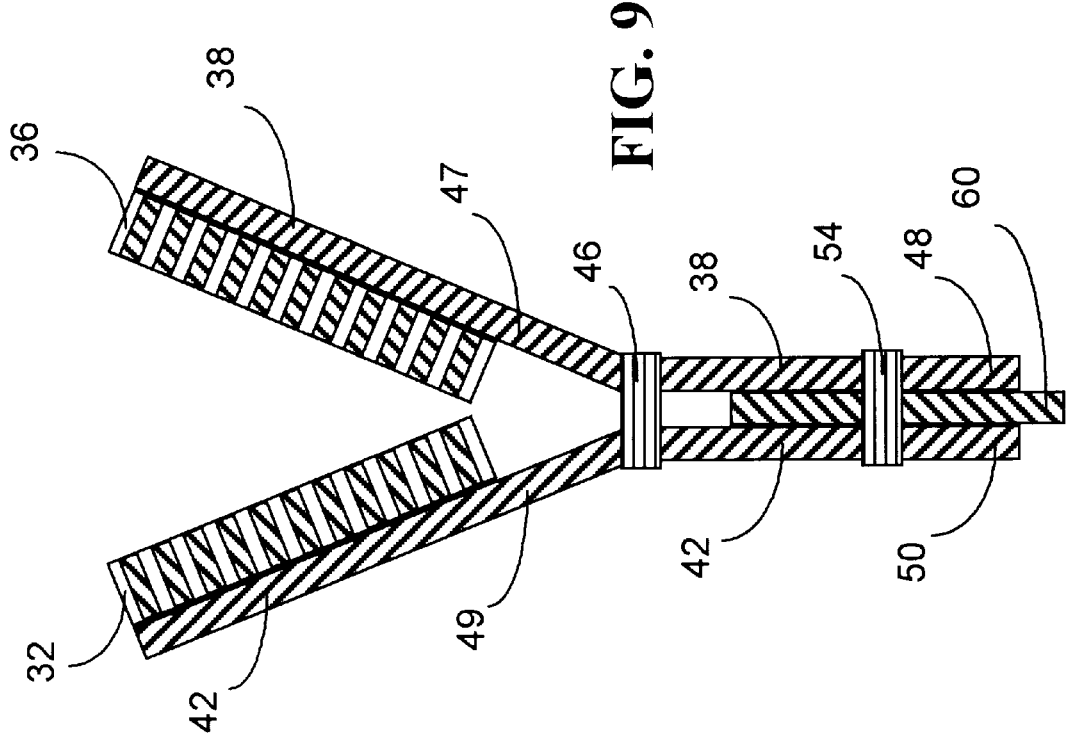
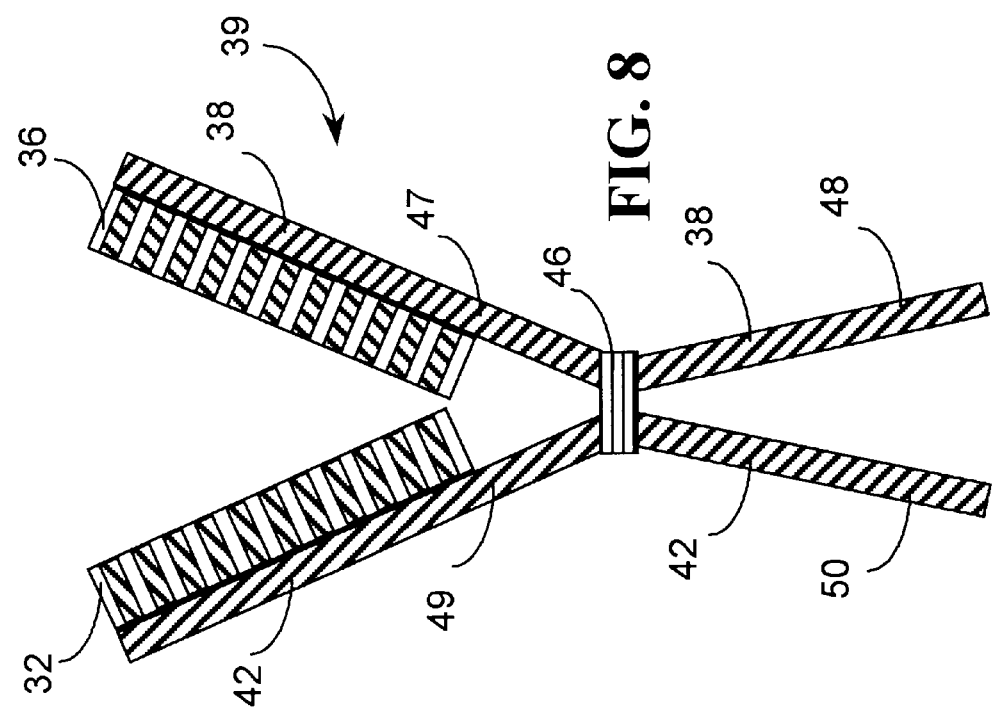

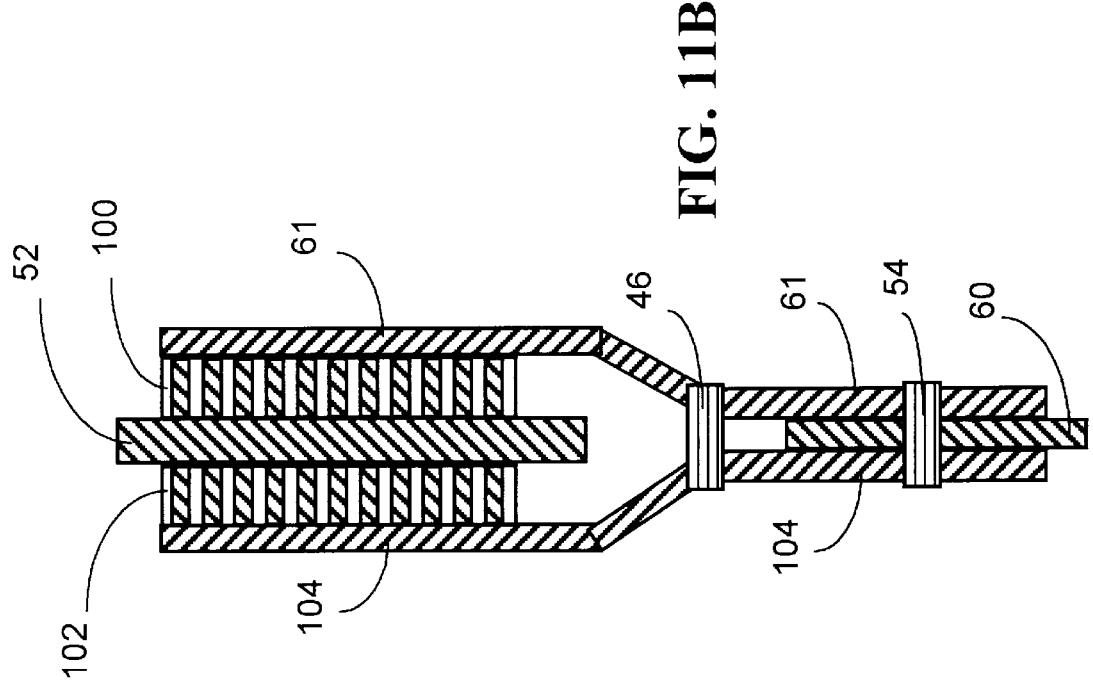
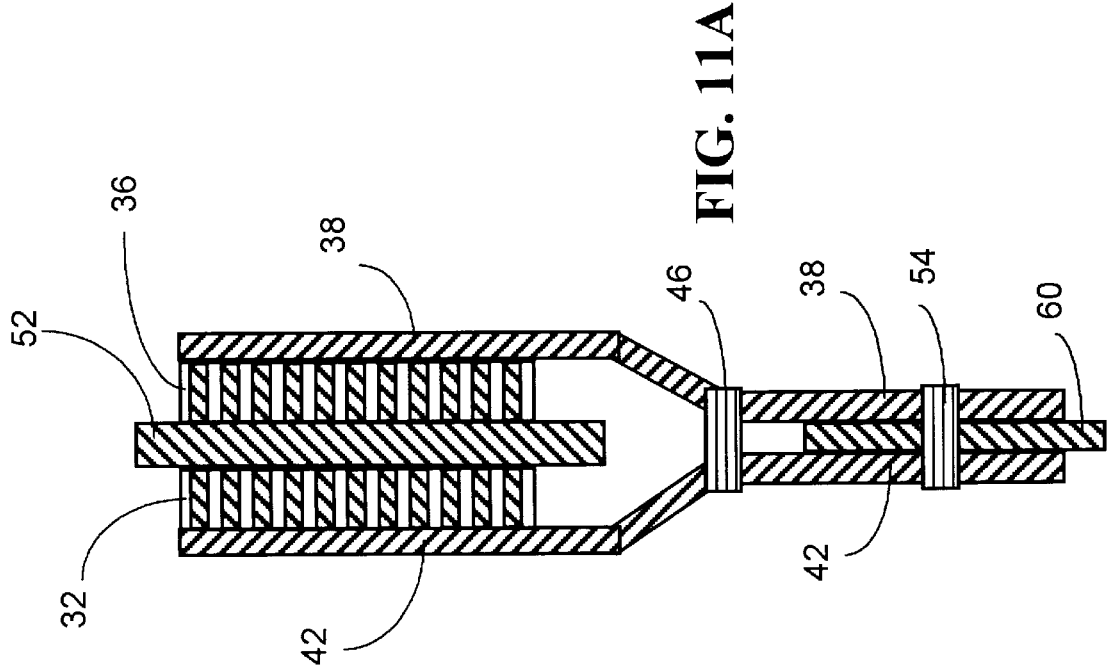
FIG. 11A
FIG. 11B

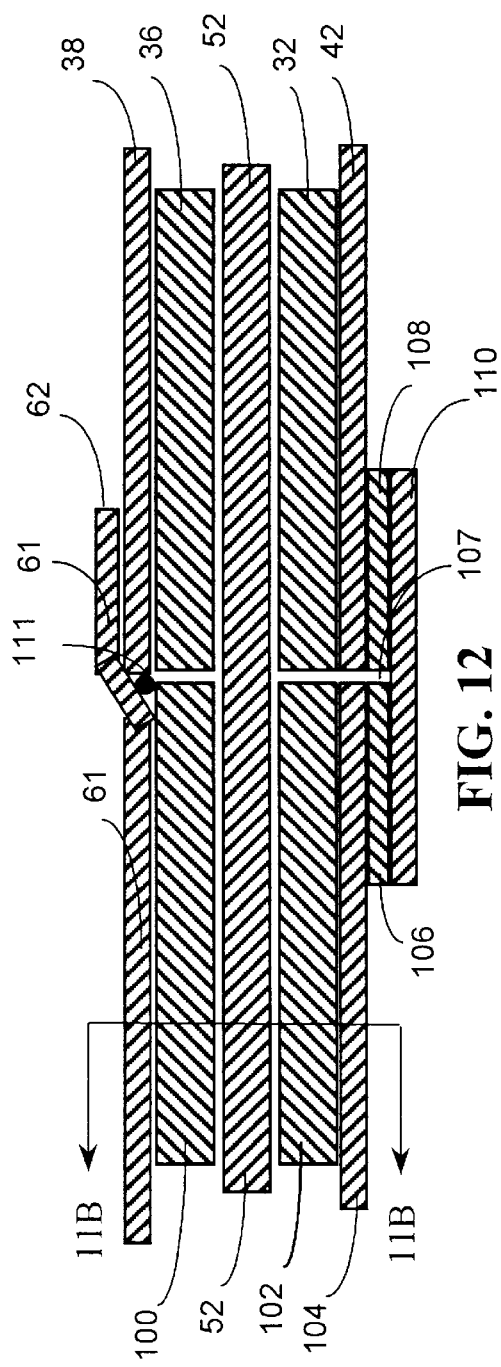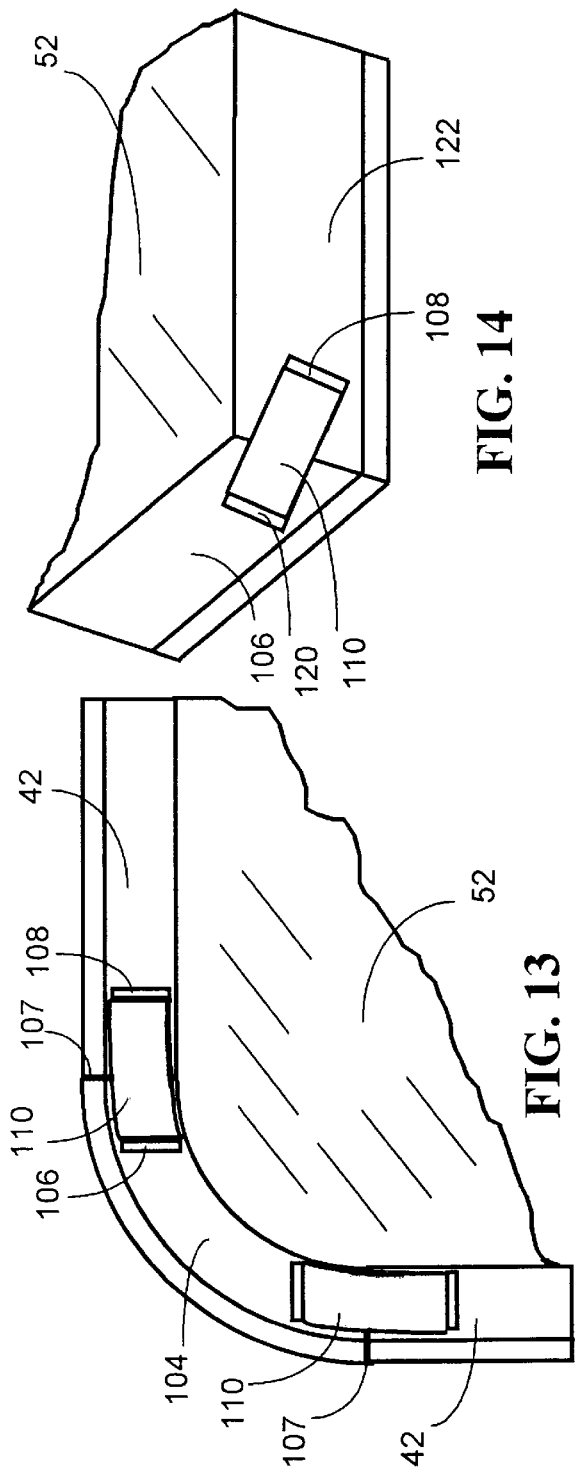

FIG. 19A  150

FORMING A PLURALITY OF SIDE ASSEMBLIES, EACH HAVING FIRST AND SECOND MAGNET STRIPS HAVING MAGNETIC POLES ALIGNED ALONG THE LENGTH OF THE STRIP AND MOUNTED ON EACH SIDE OF A "V" SHAPED TRENCH OF FLEXIBLE FRAME MATERIAL SO THAT THE MAGNET STRIPS ATTRACT EACH OTHER, AND THE SIDE ASSEMBLIES HAVING AN ATTACHMENT DEVICE COUPLED TO THE BASE OF THE V AND EXTENDING BELOW THE V

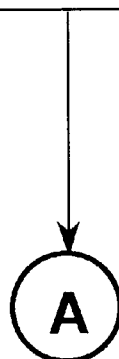

FIG. 19B

152

FOR EACH CORNER OF THE OPENING BETWEEN
A FIRST AND A SECOND SIDE ASSEMBLY,
ATTACHING A CORNER CLOSURE ASSEMBLY
BETWEEN THE FIRST AND SECOND SIDE ASSEMBLIES,
THE CORNER CLOSURE ASSEMBLY
HAVING FIRST AND SECOND MAGNET PIECES,
EACH MAGNET PIECE COUPLED ON OPPOSITE INTERIOR
WALLS OF A V SHAPED OPENING OF FLEXIBLE
FRAME MATERIAL SO THAT THE
POLES OF THE FIRST AND SECOND MAGNET
PIECES ALIGN WHEN THE V SHAPED OPENING
IS CLOSED, THE V SHAPED OPENING
HAVING AN ATTACHMENT MEANS
COUPLED TO THE BASE OF THE V
AND EXTENDING BELOW THE V FOR ATTACHING
THE CORNER CLOSURE ASSEMBLY TO THE OPENING
BETWEEN THE FIRST AND SECOND SIDE ASSEMBLIES;

FIG. 19C

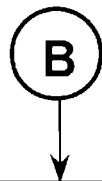

154 — FOR EACH EXTERIOR SIDE OF A CORNER CLOSURE ASSEMBLY COUPLING AND OVERLAPPING THE FLEXIBLE CORNER FRAME MATERIAL OF THE CORNER CLOSURE ASSEMBLY WITH THE FLEXIBLE FRAME MATERIAL OF THE FIRST SIDE ASSEMBLY AND THE SECOND SIDE ASSEMBLY

156 — INSERTING FROM AN INTERIOR SIDE, A WINDOW MATERIAL AND REMOVABLY CLAMPING THE WINDOW MATERIAL BETWEEN THE FIRST AND SECOND MAGNET STRIPS FOR EACH SIDE ASSEMBLY AND BETWEEN THE FIRST AND SECOND MAGNET PIECES FOR EACH CORNER CLOSURE ASSEMBLY

158 — FOR EACH INTERIOR SIDE OF A CORNER CLOSURE ASSEMBLY REMOVABLY COUPLING THE FIRST SIDE ASSEMBLY, THE CORNER CLOSURE ASSEMBLY, AND THE SECOND SIDE ASSEMBLY

MAGNETIC SOFT POCKET WINDOW REPLACEMENT SYSTEM

This patent application claims the benefit under Title 35, United States Code Section 119(e) of Provisional Application 60/049,273, which was filed Jun. 10, 1997.

BACKGROUND OF THE INVENTION

1. Field of the Invention

This invention relates to windows for convertible soft tops for automobiles and to windows for soft tops in marine applications. In particular the invention relates to the installation and replacement of such windows used in soft tops.

2. Description of the Related Art

Convertible soft tops have long been used for automobiles. These convertible tops generally have soft windows that are sewn into the convertible soft top material, which can be vinyl. FIG. 1 shows a utility vehicle 10 having a convertible soft top 12 with soft window 14. The soft windows in convertible tops are generally made of soft plastic and are notorious for eventually weathering, yellowing and cracking under the continuous assault of the sun. This is a drawback that impedes the sale of more convertibles, because an aging soft window is unattractive and also a safety concern, because of the resulting poor visibility. FIG. 2 shows a boat 20 with a marine soft top 22 having soft window 24. The concerns for automobile soft windows apply equally to soft windows for marine applications. Is important that in both the automobile and marine applications that the windows be well sealed against leaks. Present soft windows often leak after the soft window ages and cracks.

Another disadvantage of conventional convertible soft windows, is that the soft windows are permanently attached to the soft top. It is not possible to easily change the soft windows. It is desirable to be able to change the soft windows in order to have tinted windows or to have screen windows. For example in marine applications, there are times and places where screens are preferable to a solid window, because they provide ventilation. For many applications, including automobile and marine applications, tinted windows are highly desirable to provide eye protection against bright sunlight.

Accordingly, a soft top window system without the disadvantages of conventional soft windows would be highly desirable.

SUMMARY OF THE INVENTION

It is an object of this invention to provide apparatus and methods for a window system for soft tops for automobile and marine applications and other applications, such as tents. It is another object of this invention to provide apparatus and methods for easy replacement of soft top windows with windows having upgraded quality, versatility and durability. It is another object of the invention to provide for soft tops a window system that includes a window that is significantly harder and more durable than conventional soft plastic windows, while at the same time providing the flexibility necessary to fold the soft top down.

According to one embodiment of the invention, a window system is provided which includes a plurality of side assemblies each including first and second magnet strips having magnetic material aligned along a length of the magnet strip. Each magnet strip is coupled on opposite interior walls of a V shaped trench of flexible frame material. The V shaped trench has an attachment point coupled to the base of the V and extending below the V. For each corner between a first and a second side assembly, a corner closure assembly is provided. The corner closure assembly has first and second magnet pieces. Each magnet piece is coupled on opposite interior walls of a V shaped opening of flexible corner frame material. The V shaped opening has an attachment point coupled to the base of the V and extending below the V. The flexible corner frame material on the exterior side of the corner closure assembly overlaps and is coupled to the exterior of the flexible frame material of the adjacent first and second side assemblies.

A window material is removably clamped between the side assembly first and second magnet strips and between the corner closure assembly magnet pieces. Each interior side of a corner closure assembly is removably coupled to the adjacent first side assembly and the second side assembly.

In a specific embodiment each magnet strip includes a vulcanized nitrile rubber binder having barium ferrite magnet material oriented along the magnet strip length.

In another specific embodiment a plastic adhesive glues each magnet strip to an interior wall of the V shaped trench of the flexible frame material and glues each magnet piece to an interior wall of the V shaped opening of the flexible corner frame material.

In another specific embodiment the V shaped trench of flexible frame material is formed by two pieces of flexible frame material sewn together along a line. The attachment point coupled to the base of the V and extended below the V is a second V shaped trench formed by the sewn together two pieces of flexible frame material.

In another specific embodiment the flexible frame material and the flexible corner frame material are made of automobile or marine convertible top material, such as vinyl or acrylic. In another specific embodiment the window material is a polycarbonate material. Alternatively, the window material can be a screening material.

In another specific embodiment the corner closure assembly and the first and second side assemblies are removably attached by a surface of hook and loop material on either the corner closure assembly or the first and second side assemblies that fastens to a corresponding surface of uncut pile on the first and second side assemblies or the corner closure assembly, respectively. This type of attachment material is sold under the trademark VELCRO. A first VELCRO piece is attached to the first side assembly, a second VELCRO piece is attached to the corner closure assembly, and a third VELCRO piece is removably attached to the first and the second VELCRO piece.

Other objects and many of the attendant features of this invention will be more readily appreciated as the same becomes better understood by reference to the following detailed descriptions and considered in connection with the accompanying drawings in which like reference symbols designate like parts throughout the figures.

BRIEF DESCRIPTION OF THE DRAWINGS

FIG. 1 shows a sport utility vehicle having a convertible soft top with a soft plastic window according to the prior art.

FIG. 2 shows a marine application with a soft top having a soft plastic window according to the prior art.

FIG. 6 shows a cross-section along line 6—6 of FIG. 5 according to the present invention.

FIG. 7 shows an assembly having two magnetic material strips each bonded to a flexible frame material according to the present invention.

FIG. 8 shows a cross-section of a window assembly having a V shaped section having magnetic material pieces and another V shaped section for attachment according to the present invention.

FIG. 9 shows a cross-section of the window assembly attached to a soft top according to the present invention.

FIG. 11A shows a cross-section along line 11A—11A of FIG. 10 according to the present invention.

FIG. 11B shows a cross-section along line 11B—11B of FIG. 12 according to the present invention.

FIG. 12 shows a cross-section along line 12—12 of FIG. 10 according to the present invention.

FIG. 13 shows an interior view of a portion of a window system illustrating removable attachment of side assemblies to a corner closure assembly according to the present invention.

FIG. 14 shows a non right angle corner application of the window system according to the present invention.

FIGS. 19A, 19B, and 19C are flow diagrams of a method for installing a window system according to the present invention.

DETAILED DESCRIPTION

Figure 3:
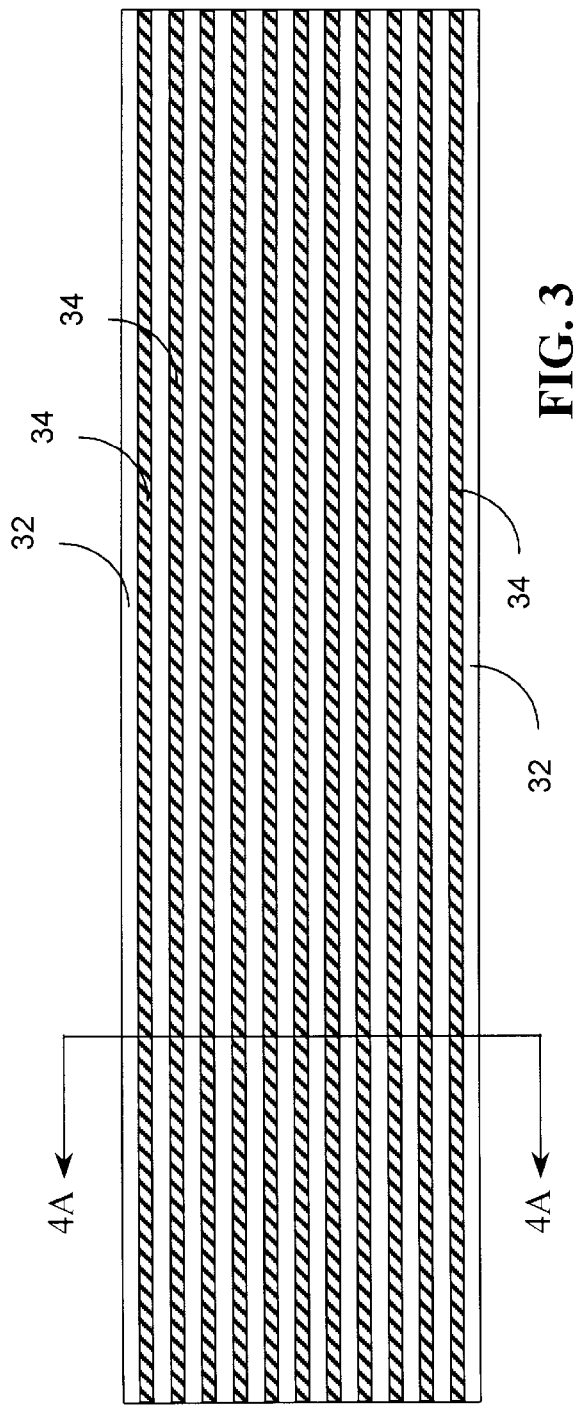
FIG. 3 shows a magnetic material strip for use in a window system according to the present invention.

Referring now to the drawings, and more particularly, to FIG. 3 a magnet material strip 32 is shown. The magnet material strip 32 is a permanent magnet material. One form of magnet material strip 32 has an energy product of $1.6 \times 10^6$ gauss-oersted and is a flexible permanent magnet material. The magnet material 32 can have multiple poles 34. Multipole magnetization permits greater control of flux density. The magnet material strip 32 is constructed using a cured vulcanized nitrile rubber binder containing oriented barium ferrite magnet material, which forms the poles 34. This magnet material possesses a strong resistance to demagnetization and is easily fabricated using standard tools such as knifes, drills, lathes, punches, mills, and grinding wheels. This form of magnet material does not chip or shatter. One such material is Plastiform B-1033 manufactured by Arnold Engineering. As shown in FIG. 3, the multiple poles 34 of oriented barium ferrite magnet material are aligned along the length of the magnet material strip 32.

Figure 4A:
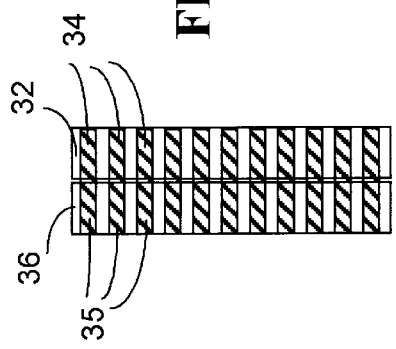
FIG. 4A shows a cross-section along line 4A—4A of FIG. 3 according to the present invention.
Figure 4B:
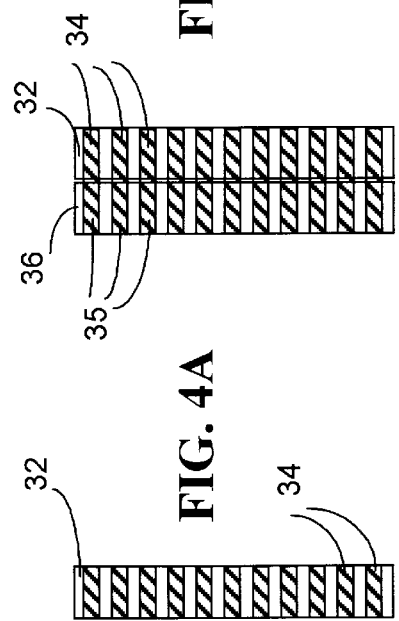
FIG. 4B shows a cross-section of two magnetic material strips joined together according to the present invention.

FIG. 4A shows a cross-section along line 4A—4A of FIG. 3 and shows the multiple poles 34. FIG. 4B is a cross-section of two magnet material strips 32 and 36 aligned so that their multiple poles 34 and 35, respectively, are aligned. By aligning the multiple poles 34 and 35 along the length of the magnetic material strips, the magnetic attraction along line 37 between magnet material strip 32 and magnet material strip 36 is maximized. If the multiple poles 34 and 35 were oriented across the width rather than the length of the magnet material strips then the attraction between the magnetic material strips would be less.

Figure 5:
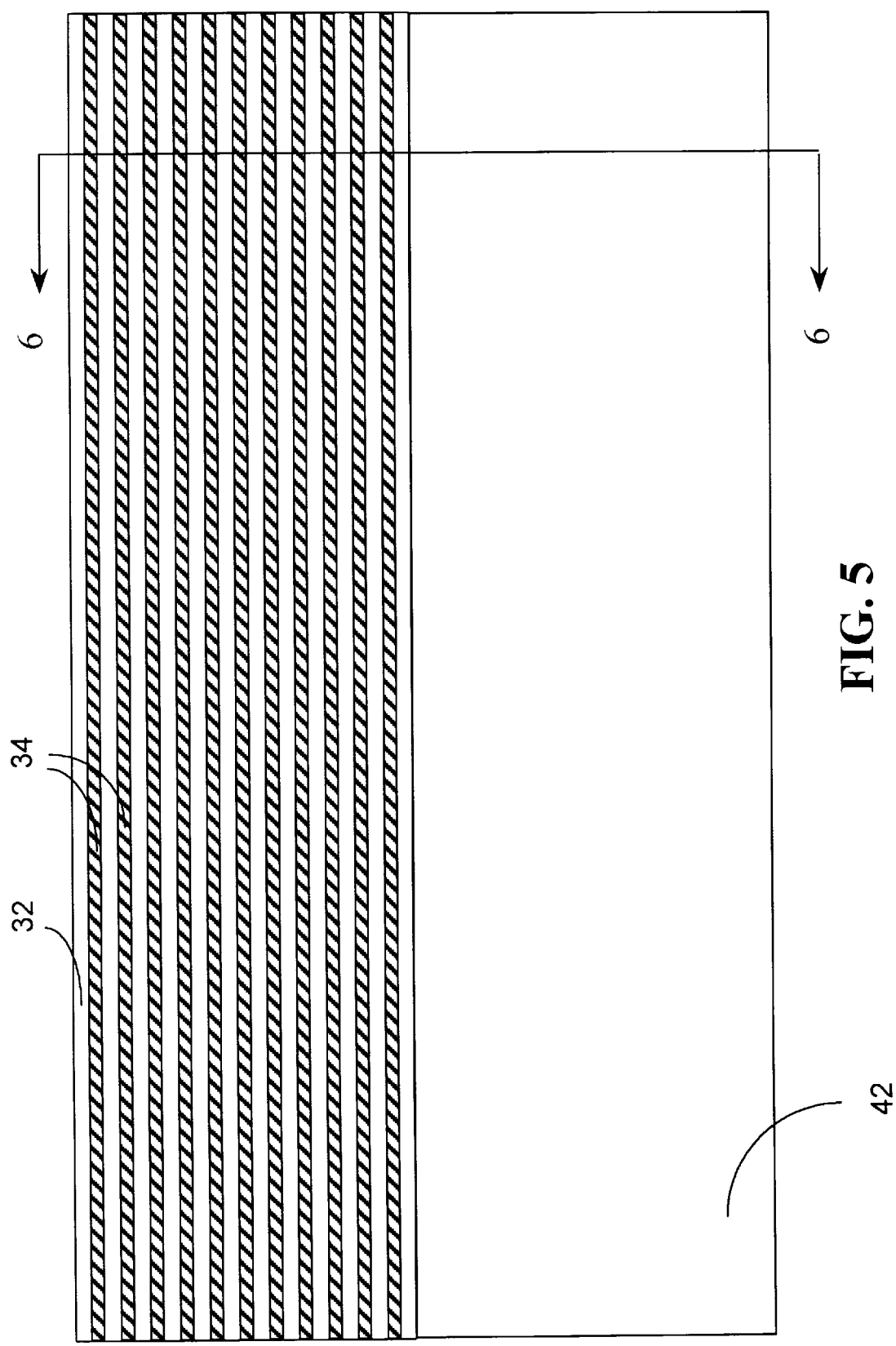
FIG. 5 shows a magnetic material strip attached to a flexible frame material according to the present invention.

FIG. 5 shows a magnetic material strip 32 having multiple poles 34 attached to a flexible frame material 42. The flexible frame material 42 can be made of vinyl, acrylic, and any other flexible material used for automobile and marine soft tops, such as shown in FIGS. 1 and 2, or flexible material used in other applications, such as tents.

FIG. 6 shows a cross-section of FIG. 5 along line 6—6 of FIG. 5. In FIG. 6 the magnetic material strip 32 is attached to flexible frame material 42 by gluing the magnetic material strip 32 along line 40 to the flexible frame material 42 using a plastic adhesive.

FIG. 7 shows two assemblies each having a magnetic material strip bonded to a flexible frame material and then aligned so that the poles of each magnet magnetic material strip are aligned so that the two assemblies are attracted magnetically along line 37. As shown, magnetic material strip 32 is bonded along line 40 to flexible frame material 42 and magnetic material strip 36 is bonded along line 41 to flexible frame material 38. The flexible frame material 38 can be made of the same material as flexible frame material 42.

FIG. 8 shows a window assembly 39, which consists of the two assemblies shown in FIG. 7 with flexible frame material 38 and flexible frame material 42 joined together by stitching along junction 46. The junction 46 can also be formed by bonding or stapling, for example, the flexible frame material 38 to the flexible frame material 42 at junction 46. The junction 46 effectively forms two V shaped sections of overlapping flexible frame material. The first V shaped section is formed by flexible frame material 49 and flexible frame material 47. The second V shaped section is formed by flexible material 50 and flexible frame material 48 and is used for attaching the window assembly to an opening in a soft top for a window. Within the V shaped section formed by flexible frame materials 47 and 49, the magnetic material strips 36 and 32 are attached to flexible frame materials 47 and 49, respectively. The V shaped section with the magnetic material strips effectively forms a pocket into which a window material may be inserted. Because the V shaped section is made from flexible frame material, the pocket for the window material is inherently flexible, which allows soft tops to be lowered and stowed, and allows tents with this window system to be folded.

FIG. 9 shows the window assembly 39 attached to flexible soft top material 60 along junction 54, which can be formed by sewing, bonding, or attaching the flexible frame material 50 and the flexible frame material 48 to the flexible soft top material 60. The flexible soft top material 60 can be made of vinyl, acrylic, and any other material used for automobile and marine soft tops and other applications, such as for tents.

Figure 10:
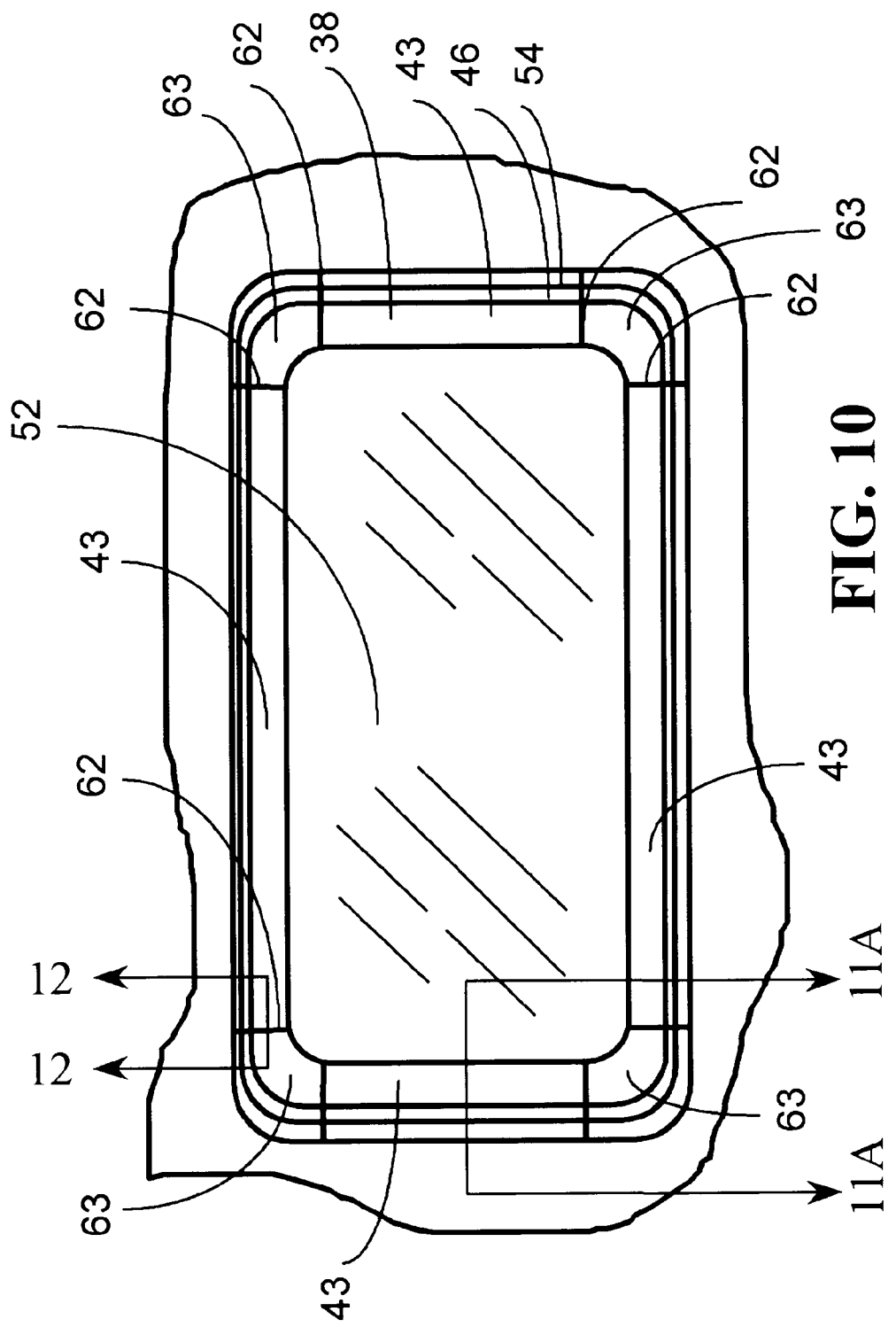
FIG. 10 shows an exterior view of a window system installed in a soft top according to the present invention.

FIG. 10 shows the exterior view of a window system installed in a soft top 60. The window system has side assemblies 43 and corner closure assemblies 61. The side assemblies 43 are attached to the soft top 60 as shown in FIG. 9. As shown, each side assembly has a flexible frame material 38 and for clarity, junctions 46 and 54 are shown on FIG. 10. FIG. 11 shows a cross-section along line 11A—11A of FIG. 10. As shown, a window material 52 is removably clamped between magnetic material strips 32 and 36. The window material 52 can be made of many materials, including Lexan, which is a polycarbonate, Plexiglas, and screening materials. Lexan is a particularly hard and durable window material, which will not yellow and crack. Lexan can be clear or be tinted as desired. Lexan is vastly superior to the soft plastic windows typically used in soft tops. The screening materials are primarily useful for marine applications to keep out insects and to allow for air flow.

FIG. 10 has corner closure assemblies 63, which are between each side assembly 43. It is important that the exterior of the window assembly be leak proof. It is also important that the window materials be easy to remove or change. The corner closure assemblies 63 provide these important features. The exterior of the corner closure assembly 63 has a flexible frame material 61. As shown in FIG. 12, flexible frame material 61 overlaps flexible frame material 38. By overlapping flexible frame material 61 and flexible frame material 38 the exterior of the window system is sealed against leaks. The end of flexible frame material 61 is line 62 shown in FIGS. 10 and 12.

As described previously flexible frame material 38 is bonded to magnetic material strip 36. Flexible frame material 61 is bonded to magnetic material piece 100. At the juncture of side assembly 43 and corner closure assembly 63 there is a gap between the magnetic material strip 36 and the magnetic material piece 100. To add further leak prevention, a silicone bead 111 is placed along the gap.

As shown in FIG. 12, window material 52 is held between magnetic material strip 36 and magnetic material strip 32. The window material 52 is also held between magnetic material piece 100 and magnetic material piece 102. Magnetic material piece 102 is bonded to flexible frame material 104. As shown in FIG. 11B, flexible corner frame material 61 and flexible corner frame material 104 are joined together at junction 46, which creates two V shaped openings, one of which contains the magnetic material pieces, and the other of which provides an attachment means for attaching the corner closure assembly to the soft top 60 by, for example, sewing flexible corner frame material 61 and flexible corner frame material 104 to soft top 60.

There is a gap 107 between flexible frame material 42 and flexible frame material 104 on the interior of the window system. This gap is purposefully provided so that the interior of side assembly 43 defined as magnetic material strip 32 and flexible frame material 42, can be drawn back in order to easily install or remove and replace the window material 52. In a similar manner the interior of corner closure assembly 63 defined as magnetic material piece 102 and flexible corner frame material 104, can be drawn back in order to install or replace the window material 52. However, it is desirable to be able to removably attach the flexible frame material 42 to flexible corner frame material 104 in order to cover the gap 107. This is provided for by attaching a section of VELCRO 106 to flexible corner frame material 104 and attaching a section of VELCRO 108 to flexible frame material 42. VELCRO is a trademark for a material consisting of a surface hook and loop material on one surface that removably attaches to a second surface of uncut pile. Then to join the interior of the side assembly to the corner closure assembly a removable section of VELCRO 110 is removably attached to VELCRO 106 and VELCRO 108.

To replace or install window material 52 into the window assembly, it is only necessary to remove VELCRO 110 and then draw back the interior of the side assemblies 43 and the interior of the corner closure assemblies 63. At that point the window material 52 is easily accessible.

FIG. 13 is an interior view of a corner closure assembly removably attached to a side assembly. As shown, at each gap 107, VELCRO can be used to removably attach the side assemblies to the corner closure assemblies.

FIG. 14 illustrates another window shape that can be accommodated by the window system. FIG. 14 shows the interior of the window system for this window shape. Here the interior of two side assemblies 120 and 122 are joined at an obtuse angle. Again VELCRO pieces 106 and 108 are attached to the interior of side assemblies 120 and 122, respectively. Then VELCRO piece 110 is used to removably attach side assembly 120 to side assembly 122 by removably attaching VELCRO piece 110 to VELCRO pieces 106 and 108.

Figure 15B:
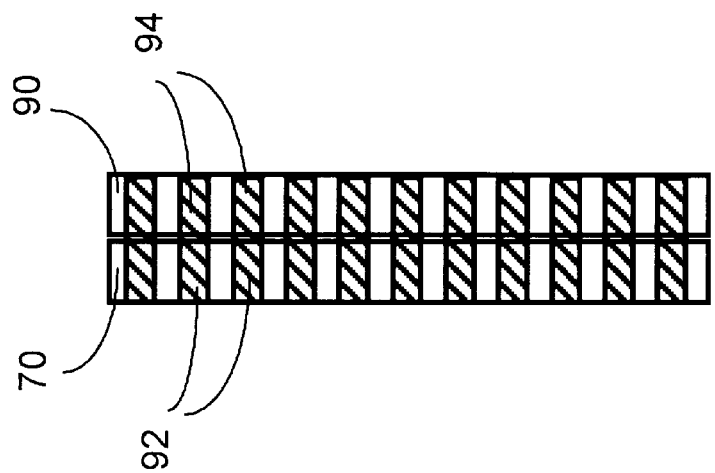
FIG. 15B shows a cross-section along line 15B—15B of FIG. 15A.
Figure 15A:
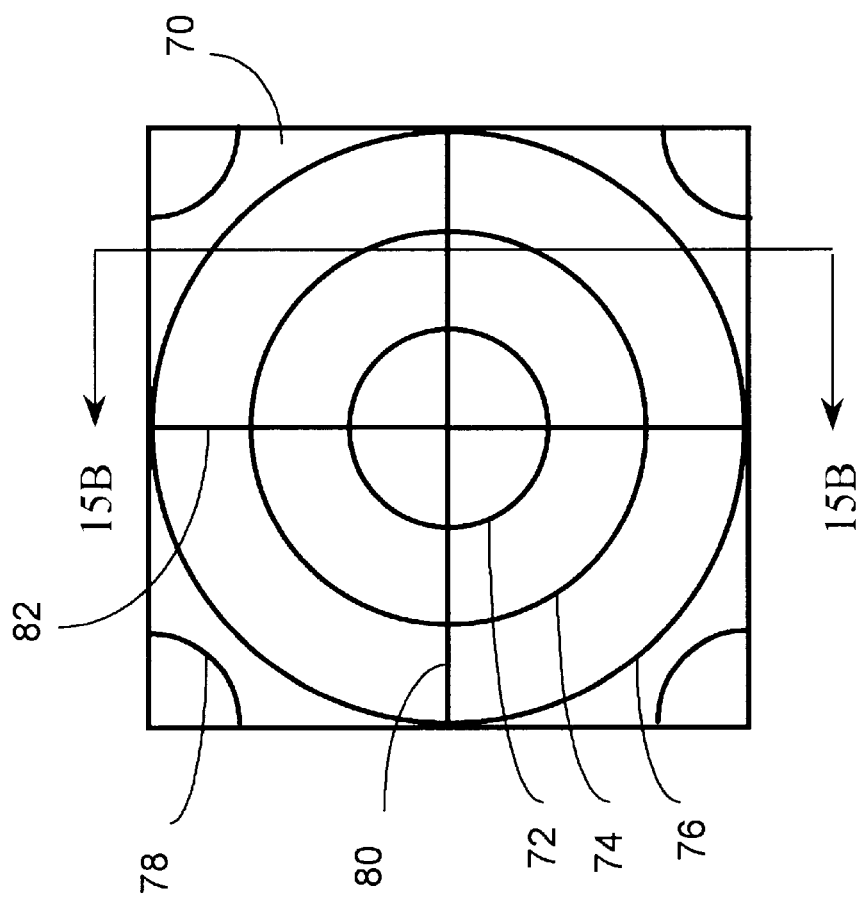
FIG. 15A shows a punch pattern on a joined pair of magnet pieces for constructing corner sections of magnetic pieces according to the present invention.

FIGS. 15A and 15B illustrate a method of forming corner closure assemblies. The method illustrated is for right angle corners; however, other non straight magnetic material pieces can be formed in a similar manner. To form a non straight magnetic material piece from a section of magnetic material such as that shown in FIG. 3, which has magnetic poles 34 aligned along the length of the magnetic material, two sections of the magnetic material are first placed next to each other so that the magnetic poles are aligned. This is illustrated in FIG. 15B which shows magnetic material sections 70 and 90 aligned so that poles 92 and poles 94, respectively, are aligned. Then the joined magnetic material sections are divided into matching magnetic material pieces by punching or cutting the joined magnetic material sections as needed. FIG. 15A illustrates how joined magnetic material sections can be divided by using a punch to form corner closure magnetic pieces. Punch lines 72, 74, and 76 along with punch lines 80 and 82 divide a three square inch section into one inch wide corner closure magnetic pieces each with an increasing radius. Punch lines 78 prevent waste of the corner pieces. By first joining the magnetic material sections together and then punching them along the punch lines, the alignment of the magnetic poles is automatic.

Figure 16:
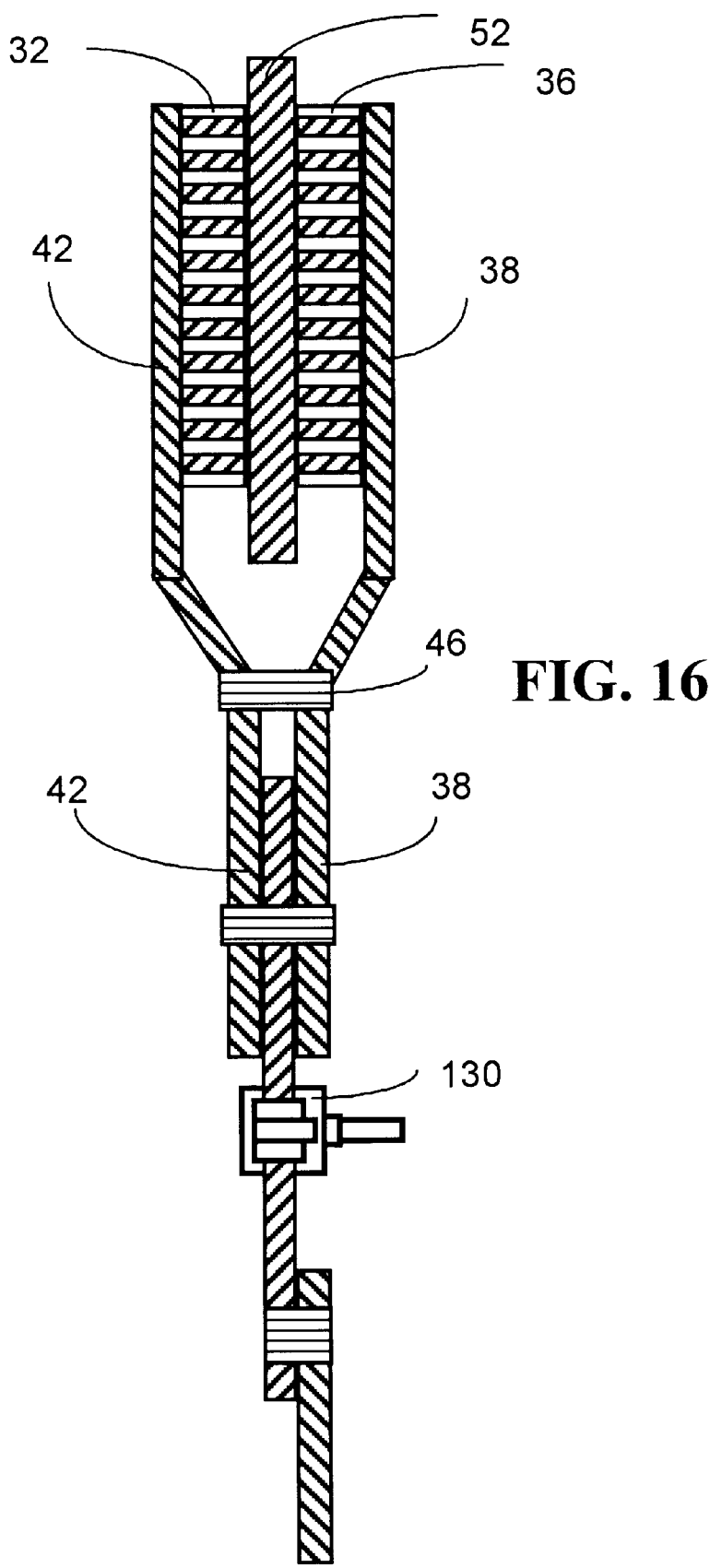
FIG. 16 shows a zipper attachment for mounting the window assembly according to the present invention.
Figure 17:
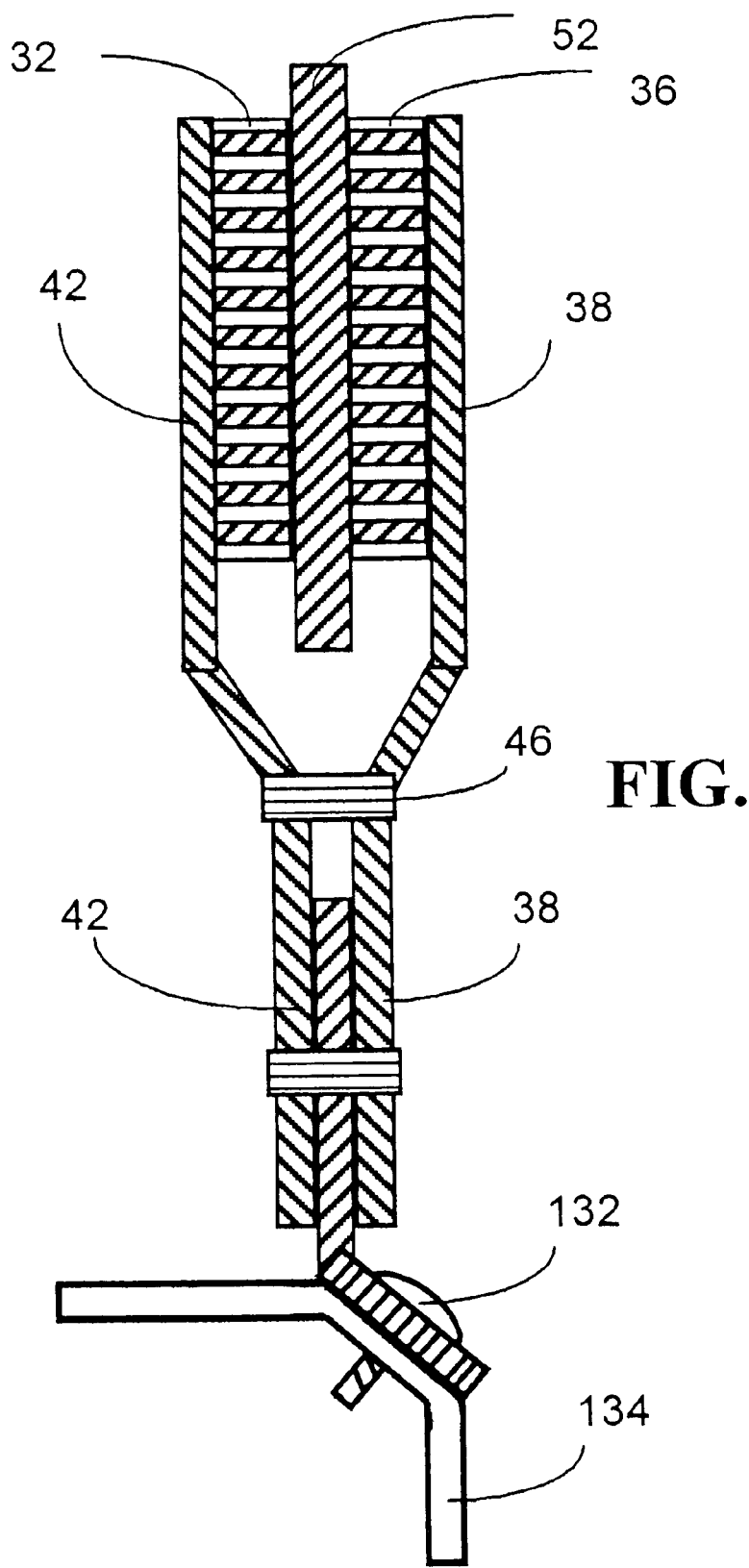
FIG. 17 shows a fastener attachment for mounting the window assembly according to the present invention.
Figure 18:
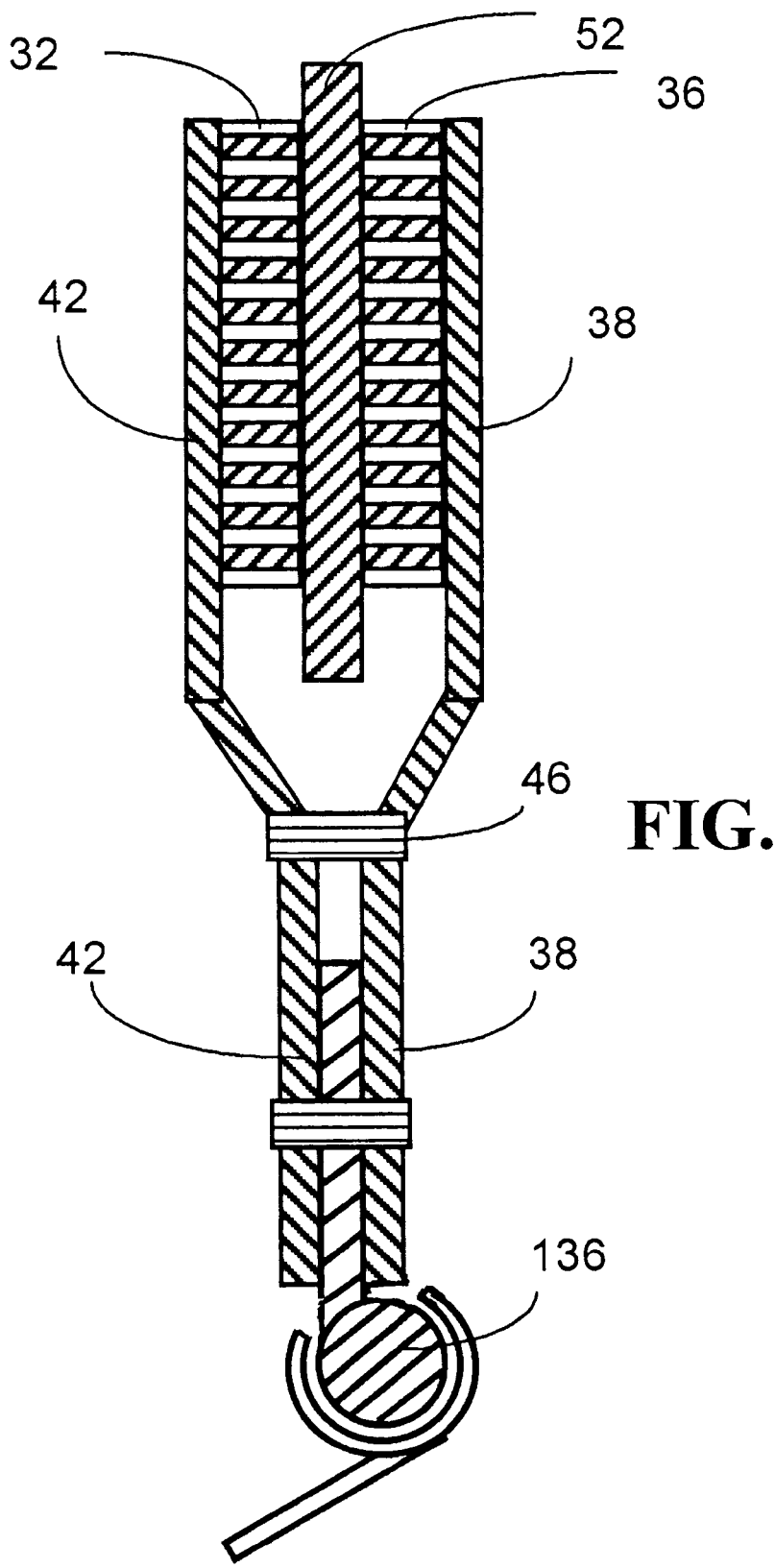
FIG. 18 shows an extruded frame for mounting the window assembly according to the present invention.

FIGS. 16, 17 and 18 show only a few of the multiplicity of ways to attach the window system. In FIG. 16 a zipper 130 is used to attach the window assembly 39 as shown in FIG. 8, to the soft top 60. In FIG. 17 a fastener 132 is used to attach the window assembly 39 to a boat hull 134. In FIG. 18 an extruded frame 136 is used to attach the window assembly 39.

FIGS. 19A, 19B, and 19C are flow diagrams of a method for installing windows. In step 150 a plurality of side assemblies are formed, each side assembly having first and second magnet strips. Each magnet strip has magnetic material aligned along a length of the magnet strip and each magnet strip is attached to opposite interior walls of a V shaped trench of flexible frame material so that the magnetic material of the first magnet strip attracts the magnetic material of the second magnet strip. Glue can be used for attaching the magnet material to the flexible frame material. The V shaped trench has an attachment device coupled to the base of the V and extending below the V. This step forms the window assemblies 39 of FIG. 8.

In step 152 for each corner of the opening between a first and a second side assembly, a corner closure assembly is attached between the first and second side assemblies. The corner closure assembly has first and second magnet pieces, each magnet piece coupled on opposite interior walls of a V shaped opening of flexible corner frame material so that magnetic material in the first magnet piece attracts the magnetic material in the second magnet piece. The V shaped opening has an attachment means coupled to the base of the V and extending below the V. This step forms the corner closure assemblies discussed above in reference to FIGS. 10, 11B, 12, and 13.

In step 154, for each exterior side of a corner closure assembly, the flexible corner frame material of the corner closure assembly is coupled and overlapped with the flexible frame material of the first side assembly and the second side assembly. Step 154 accomplishes the overlap of the frame material as illustrated in FIG. 12 for flexible corner frame material 61 and flexible frame material 38.

In step 156 a window material is removably clamped between the first and second magnet strips for each side assembly and between the first and second magnet pieces for each corner closure assembly, as shown in FIG. 12.

Then in step 158 for each interior side of a corner closure assembly, the first side assembly and the corner closure assembly are removably coupled, and the second side assembly and the corner closure assembly are removably coupled, as shown in FIG. 12.

The method of removably coupling the first side assembly and the corner closure assembly includes the steps of attaching a first VELCRO piece to the first side assembly, attaching a second VELCRO piece to the corner closure assembly, and removably attaching a third VELCRO piece to the first and the second VELCRO piece.

Finally, each side assembly and corner closure assembly is attached to a side of a soft top opening or other attachment point as needed, such as to a boat hull.

The window system described above provides a significant improvement for soft top windows for automobile and marine applications and other applications, such as tents. The window system provides for easy replacement of conventional soft top windows with windows having better quality, versatility and durability. One type of window material Lexan is significantly harder and more durable than conventional soft plastic windows. The window system provides the flexibility necessary to fold and stow a soft top. The window system can also accommodate screens.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention. It is therefore intended by the appended claims to cover any and all such applications, modifications and embodiments within the scope of the present invention.

What is claimed is:

1. A window system comprising:

a plurality of side assemblies, each side assembly having a first flexible material frame member and a second flexible material frame member, the first and second flexible material frame members being coupled together along a seam;

first and second magnetic material strips, each magnetic material strip having magnetic material aligned along a length of the magnet strip, the first magnet strip coupled to an interior wall of the first flexible material frame member, and the second magnet strip coupled on an opposite interior wall of the second flexible material frame member adapted so that the magnetic material of the first magnet strip attracts the magnetic material of the second magnet strip;

a plurality of corner closure assemblies, each corner assembly adapted for joining a first adjacent side assembly and a second adjacent side assembly of the plurality of side assemblies and each corner closure assembly having a first flexible material corner member and a second flexible material corner member, the first and second flexible material corner members being coupled together along a seam, and having first and second magnetic material pieces, the first magnet piece coupled to an interior wall of the first flexible material corner member, and the second magnet piece coupled on an opposite interior wall of the second flexible material corner member adapted so that the first magnet piece attracts the second magnet piece;

a window material removably clamped between the first and second magnet strips of each side assembly and between the first and second magnet pieces of each corner closure assembly; and for each second flexible material corner member of a corner closure assembly, means for removably coupling the second flexible material corner member to the second flexible material frame member of the first adjacent side assembly and removably coupling the second flexible material corner member to the second flexible material frame member of the second adjacent side assembly.

2. The window system of claim 1 wherein the first magnet strip and the second magnet strip each comprise a vulcanized nitrile rubber binder comprising oriented barium ferrite magnet material arranged in a plurality of poles.

3. The window system of claim 1 further comprising:

plastic adhesive for gluing the first magnet strip to the interior wall of the first flexible material frame member and the second magnet strip to the opposite interior wall of the second flexible material frame member, and for gluing the first magnet piece to the interior wall of the first flexible material corner member and the second magnet piece to the opposite interior wall of the second flexible material corner member.

4. The window system of claim 1 wherein the first and second flexible material frame members and the first and second flexible material corner members comprise automobile convertible top material.

5. The window system of claim 1 wherein the window material comprises a polycarbonate.

6. The window system of claim 1 wherein the window material comprises a screen.

7. The window system of claim 1 wherein the means for removably coupling the second flexible material corner member to the second flexible material frame member of the first adjacent side assembly and removably coupling the second flexible material corner member to the second flexible material frame member of the second adjacent side assembly comprises:

a surface of hook and loop material attached to the second flexible material corner member and a corresponding surface of uncut pile attached to the second flexible material frame member of the first adjacent side assembly and the second flexible material frame member of the second adjacent side assembly.

8. The window system of claim 1 wherein the means for removably coupling the second flexible material corner member to the second flexible material frame member of the first adjacent side assembly and removably coupling the second flexible material corner member to the second flexible material frame member of the second adjacent side assembly comprises:

a surface of uncut pile attached to the second flexible material corner member and a corresponding surface of hook and loop material attached to the second flexible material frame member of the first adjacent side assembly and the second flexible material frame member of the second adjacent side assembly.

9. The window system of claim 1 wherein:

the first flexible material corner member overlaps the first flexible material frame member of the first adjacent side assembly; and the first flexible material corner member overlaps the first flexible material frame member of the second adjacent side assembly.

10. A method for installing windows, the method comprising the steps of:

forming a plurality of side assemblies, each side assembly having a first flexible material frame member and a second flexible material frame member, the first and second flexible material frame members being coupled together along a seam;

coupling first and second magnetic material strips, each magnetic material strip having magnetic material aligned along a length of the magnet strip, the first magnet strip coupled to an interior wall of the first flexible material frame member, and the second magnet strip coupled on an opposite interior wall of the second flexible material frame member adapted so that the magnetic material of the first magnet strip attracts the magnetic material of the second magnet strip;

forming a plurality of corner closure assemblies, each corner assembly adapted for joining a first adjacent side assembly and a second adjacent side assembly of the plurality of side assemblies and each corner closure assembly having a first flexible material corner member and a second flexible material corner member, the first and second flexible material corner members being coupled together along a seam, and having first and second magnetic material pieces, the first magnet piece coupled to an interior wall of the first flexible material corner member, and the second magnet piece coupled on an opposite interior wall of the second flexible material corner member adapted so that the first magnet piece attracts the second magnet piece;

removably clamping a window material between the first and second magnet strips of each side assembly and between the first and second magnet pieces of each corner closure assembly; and removably coupling each second flexible material corner member of a corner closure assembly to the second flexible material frame member of the first adjacent side assembly and to the second flexible material frame member of the second adjacent side assembly.

11. The method of installing windows of claim 10 wherein the first magnet strip and the second magnet strip each comprise a vulcanized nitrile rubber binder comprising oriented barium ferrite magnet material arranged in a plurality of poles.

12. The method of installing windows of claim 10 further comprising the steps of:

gluing the first magnet strip to the interior wall of the first flexible material frame member;

gluing the second magnet strip to the opposite interior wall of the second flexible material frame member;

gluing the first magnet piece to the interior wall of the first flexible material corner member; and gluing the second magnet piece to the opposite interior wall of the second flexible material corner member.

13. The method of installing windows of claim 10 wherein the first and second flexible material frame members and the first and second flexible material corner members comprise automobile convertible top material.

14. The method of installing windows of claim 10 wherein the window material comprises a polycarboniate.

15. The method of installing windows of claim 10 wherein the window material comprises a screen.

16. The method of installing windows of claim 10 wherein the step of removably coupling each second flexible material corner member of a corner closure assembly to the second flexible material frame member of the first adjacent side assembly and to the second flexible material frame member of the second adjacent side assembly comprises the steps of:

coupling a first surface of hook and loop material attached to the second flexible material corner member to a corresponding first surface of uncut pile attached to the second flexible material frame member of the first adjacent side assembly; and coupling a second surface of hook and loop material attached to the second flexible material corner member to a corresponding second surface of uncut pile attached to the second flexible material frame member of the second adjacent side assembly.

17. The method of installing windows of claim 10 wherein the step of removably coupling each second flexible material corner member of a corner closure assembly to the second flexible material frame member of the first adjacent side assembly and to the second flexible material frame member of the second adjacent side assembly comprises the steps of:

coupling a first surface uncut pile attached to the second flexible material corner member to a corresponding first surface of hook and loop material attached to the second flexible material frame member of the first adjacent side assembly; and coupling a second surface of uncut pile attached to the second flexible material corner member to a corresponding second surface of hook and loop material attached to the second flexible material frame member of the second adjacent side assembly.

* * * * *